Sept. 9, 1924.

C. H. GREGORIE

INSECTPROOF BREAD AND CAKE BOX

Filed May 9, 1923    2 Sheets-Sheet 1

1,507,731

Inventor
Charles H. Gregorie
By Lamaster
Attorney

Sept. 9, 1924.  
C. H. GREGORIE  
INSECTPROOF BREAD AND CAKE BOX  
Filed May 9, 1923  
1,507,731  
2 Sheets-Sheet 2
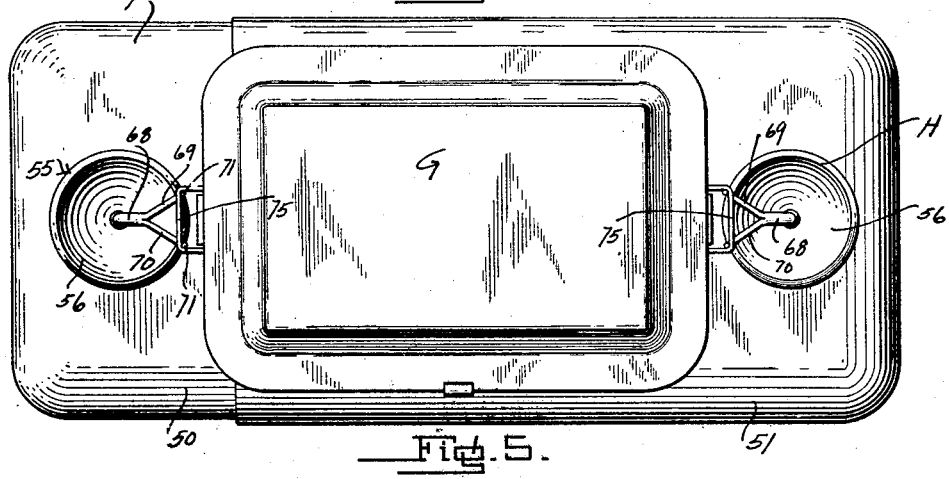
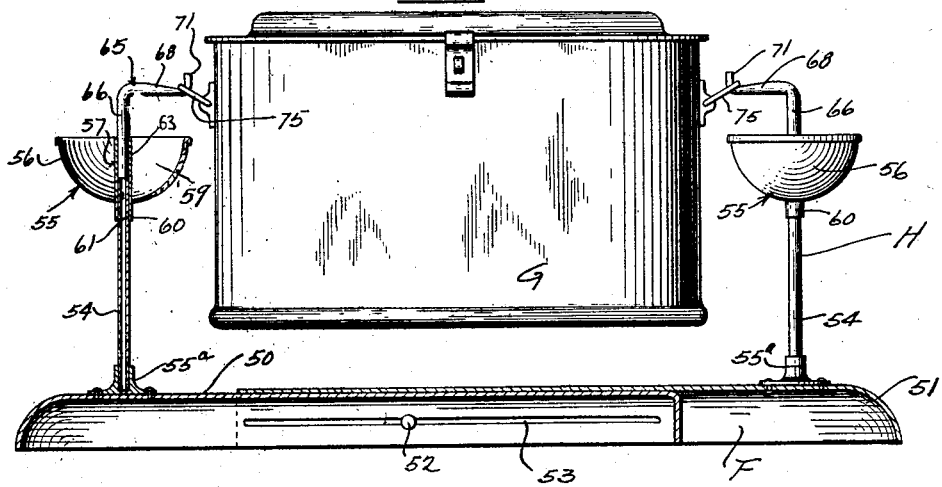
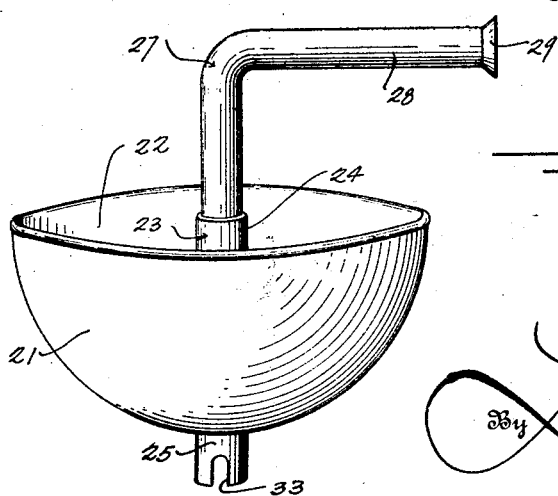
Inventor  
Charles H. Gregorie  
By Lancaster Allwine  
Attorneys Patented Sept. 9, 1924.

1,507,731

UNITED STATES PATENT OFFICE.

CHARLES HENRY GREGORIE, OF MACON, GEORGIA.

INSECTPROOF BREAD AND CAKE BOX.

Application filed May 9, 1923. Serial No. 637,796.

*To all whom it may concern:*

Be it known that I, CHARLES H. GREGORIE, a citizen of the United States, residing at Macon, in the county of Bibb and State of Georgia, have invented certain new and useful Improvements in Insectproof Bread and Cake Boxes, of which the following is a specification.

This invention relates to improved construction for supporting an article such as a bread or cake receptacle, so that crawling insects will be prevented from having access thereto.

The primary object of this invention is the provision of an insect proof receptacle showing general construction, such as illustrated in my copending application Serial No. 562,396 filed May 20, 1922, although embodying novel features which render the same more practical from the standpoints of simplicity and economy of manufacture.

A further object of this invention is the provision of a relatively simple and compact construction whereby a receptacle, such as a bread or cake box, may be supported in suspended manner, so that crawling insects cannot reach the contents of the same and by means of which removal of the contents of the receptacle is facilitated.

Other objects and advantages of this invention will be apparent during the course of the following detailed description.

In the accompanying drawings, forming a part of this specification, and wherein similar reference characters designate corresponding parts throughout the several views:

Figure 4 is a plan view of a modified form of this invention.

Figure 5 is a cross sectional view, taken vertically through improved details of this invention.

Figure 6 is a perspective view of a container adapted to receive an insect repelling liquid, showing the simple and novel construction of the same and its associated details.

Figure 1:
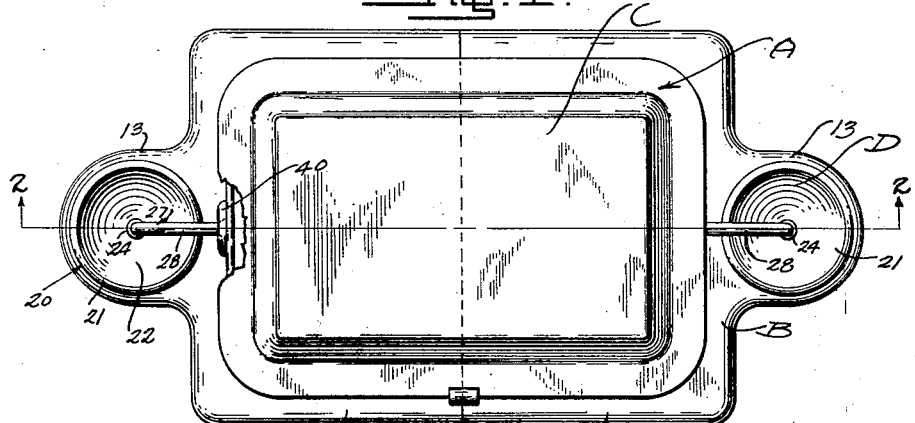
Figure 1 is a plan view of the preferred form of this invention.

In the drawings, wherein for the purpose of illustration are shown preferred and modified forms of this invention, the letter A may generally designate the preferred form of invention which may include a supporting base B; a receptacle C such as a bread or cake box; and means D for co-operation upon the base B in supporting the receptacle C in insectproof manner. The modified form of invention E may generally include a supporting base F, a receptacle G for receiving articles such as bread and cake, and means H cooperating upon the base F for supporting the receptacle G so that insects may not have access thereto.

Referring to the preferred form of this invention, the base B may be of any approved construction, although it is preferred to construct the same of wood. It includes a plurality of sections, such as 10 and 11, which are similarly formed, and connected in hinged manner by hinges 12 upon the top surface thereof. At the outer ends, the sections 10 and 11 are preferably provided with reduced extensions or feet 13, upon which hollow tubular standards 17 of the means D are vertically positioned. These standards 17 may be suitably secured to the outstanding portions 13 of the base B, as by connection in metal sockets 19 which may be detachably positioned upon the top surface of the base B, as by screw elements 20ª. In lieu of the provision of the socket members 19, the lower ends of the vertical tubular standards 17 may be suitably embedded in the base sections 10 or 11, or screw threaded therein, according to the quality of the improved device A.

Further referring to the means D, each of the vertical standards 17 is preferably provided with a detachable bracket construction 20 at the top thereof, which may include a semi-spherical cup 21 providing a liquid receiving pocket 22 therein. The section 20 furthermore includes a hollow tube 23 extending radially through the cup 21, providing a relatively long portion 24 which extends upwardly within the pocket 22, and a portion 25 which extends outwardly of the bottom or convex side of the cup 21, and provides a socket 26 opening from the end 25 within which the upper end of a standard 17 may fit. The tubular portion 23 is of course soldered or otherwise secured to the cup 21, and at its upper end 24 has an L-shaped bracket portion 27 welded therein, which provides the horizontal bar portion 28 having upon its free end a bevelled annular head 29.

A novel connection is provided at the juncture of the standard 17 with the structure 20 which the same is to support, which may include a pin 30 transversely carried in a fixed manner at the upper end of the standard 17, and extending laterally of the sides of said standard for receiving the depending portion 25 of the tubular member 23 which extends below the cup 21; said portion 25 being provided with oppositely disposed slots 33 inwardly from the marginal edge thereof, substantially as is illustrated in Figure 6 of the drawings. When a structure 20 is mounted upon its standard 17 so that the slots 33 receive the laterally extending portions of a pin 30, it is obvious that the cup 21 is disposed to receive a liquid within the pocket 22 thereof, and the horizontal portions 28 extend in horizontal manner over their respective cups 21. As positioned upon the base B, the horizontal portions 28 extend inwardly toward each other, with the bevelled head portions 29 thereof in facing relation to receive a receptacle.

Referring to the container C, the same may include a body portion 35 of any approved construction, which may have associated therewith a hinged lid 38, to provide a compartment 39 adapted to receive articles such as bread and cake. At opposite ends of the body 35, substantially U-shaped socket members 40 may be provided, which have open ways 41 extending into the gradually enlarged sockets 42 thereof, said ways and sockets 41 and 42 opening at the lower ends of the members 40 to permit the slidable insertion of the bevelled heads 29 from the lower ends of said members, so that said heads 29 when disposed within the sockets 42 support the receptacle C against liability of lateral displacement.

Figure 2:
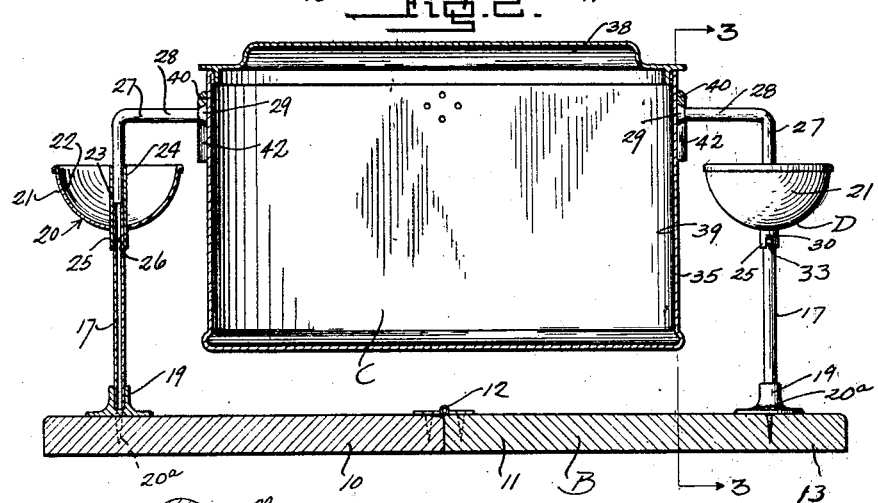
Figure 2 is a cross sectional view, taken substantially on the line 2—2 of Figure 1.
Figure 3:
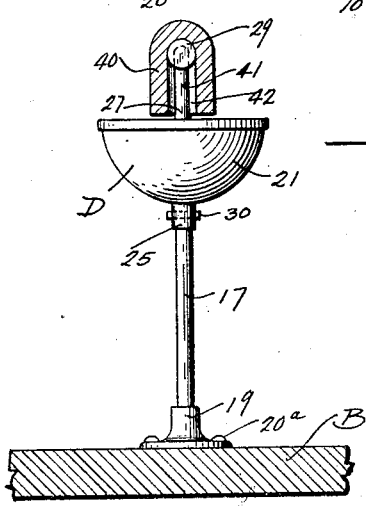
Figure 3 is a fragmentary cross sectional view, taken substantially on the line 3—3 of Figure 2.

As above mentioned, a standard 17 is vertically positioned upon each of the sections 10 and 11, and a cup 21 is of course detachably positioned on the upper end of each standard adapted to receive a liquid to repel crawling insects. The receptacle C may then be placed upon the bracket arms 28 of the means D, to oscillatively suspend the receptacle C intermediate the cups 21 and above the base B, substantially as is illustrated in Figure 2 of the drawings. From this it is obvious that it will be impossible for insects to reach the receptacle C as to have access to the contents thereof, since a bracket arm 27 and its mounting construction will extend upwardly within the bracket receiving compartment 22, so that liquid will, of course, surround the hollow tubular portion 23 and the bracket 27.

The object of providing a sectional base B is for compactness in the improved construction A as the same may be neatly folded for shipping purposes. The top marginal edge of the standard 17 when disposed within its socket 25 preferably receives the lower end of the L-shaped bracket 27 thereagainst, although the weight of the entire section 20 may be disposed upon the lateral extensions of the pin 30. The omission of any screw threads and the provision of hollow tubular standards facilitates manufacture of the improved device, and materially lowers the cost of production of the same. It is to be noted that the cup 21 together with the hollow tubular portion 23 thereof and the L-shaped bracket member 27 are of rigid construction, being soldered, welded, or otherwise secured together in the arrangement illustrated in Figure 6 of the drawings.

Referring to the modified form of invention E, the base F thereof is preferably constructed of sheet metal, including sections 50 and 51 telescopically connected together in any approved manner, as by having pins or extensions 52 of one section 51 slidably extending into longitudinally extending slots 53 of the other section 50. Each of the sections 50 and 51 preferably support hollow or tubular vertical standards 54 at the ends thereof, as by disposition in the sockets 55ᵃ upon the top surfaces of said base sections. At the upper ends of the standards 54, detachable structures 55 may be provided, each of which includes a semi-spherical cup 56 analogous to the cup 21 above described for the preferred form of this invention. The structures 55 furthermore each include the hollow or tubular portion 57 radially extending therethrough, as to provide a portion 58 which extends upwardly into and through the pocket 59 of the cup 56, and a lower depending portion 60 which extends below and outwardly of the convex side of the cup 56, and is open to provide a socket 61 for the detachable reception of the upper end of a standard 54. Secured in fixed manner in the upper end 58 of the tube 57, each of the structures 55 is preferably provided with a bracket member 65, which includes the vertical portion 66 for rigid connection, as by welding or soldering, in the tubular portion 58, and the horizontally extending bifurcated portion 68 which provides the supporting fingers 69 and 70 diverging from the horizontal portion 68, and being upturned, as at 71, upon their free ends.

The receptacle G may be a conventional bread or cake box, or in fact any article of like nature, which may include the wire bails or handles 75 at the ends thereof, so positioned that they may engage over the bracket fingers 69 and 70 to engage the upturned ends 71 thereof, whereby the receptacle G may be suspended intermediate the cups 56 in the manner illustrated in Figure 5 of the drawings.

It is obvious that the provision of the telescopic base F is an important feature, since the receptacles G vary in length and the bifurcated bracket members 65 can thereby be positioned in spaced relation in adaption to the length of a particular receptable desired to be supported thereby.

The telescopic base F may of course be used in connection with the form of invention A, replacing the base B if so desired. The fact that the constructions 20 have been non-rotatably or non-movably positioned upon their standards 17, through the provision of the pins 30 operating within the slots 33, insures that the sections 20 will not move laterally when the receptacle C is pivotally swung to have access to the contents thereof.

From the foregoing description of this invention, it is apparent that practical, economical, and simple improvements have been provided, upon the form of invention set forth in my copending application above referred to. The omission of threaded connections and the provision of hollow tubing lower the cost of production.

Various changes in the shape, size and arrangement of parts may be made to the form of invention herein shown and described without departing from the spirit of the invention or the scope of the claims.

I claim:

1. A device for preventing insects from gaining access to an article comprising a support including a pair of hingedly connected sections, a vertical standard carried by each of said sections of the support, cups carried by said standards, and article supporting means extending from within said cups for supporting an article therebetween.

2. A device for preventing insects from gaining access to an article comprising a support, spaced standards carried by said support, pins carried at the upper ends of said standards extending laterally therefrom, cups carried by said standards including slotted portions for reception of the laterally extending portions of said pins to prevent movement of the cups upon said standards, and article supporting means extending in rigid relation from within said cups for supporting an article therebetween.

3. A device for preventing insects from gaining access to an article comprising a support, hollow tubular standards vertically carried by said support in spaced relation, pins carried by the upper ends of said standards extending laterally therefrom, liquid receiving cups, means providing a socket in said cups for receiving the upper ends of said standards, said means having slots therein for receiving the pins of said standards therein to prevent rotary movement of the cups upon said standards, and brackets connected in fixed relation to said cups extending upwardly from within the pockets thereof and adapted to receive an article whereby the same may be suspended above said support and intermediate said standards.

4. A device for preventing insects from gaining access to an article comprising a base, standards mounted upon said base, cups carried at the upper ends of said standards, and brackets of L-shaped formation connected in fixed relation to said cups including portions extending upwardly from within the pocket of the cups and portions extending laterally over the cups in horizontal position, a receptacle, and means carried at the ends of the receptacle for detachably engaging the ends of said horizontal portions so that the same may be suspended above said base and between said standards.

5. As an article of manufacture, a cup having a hollow tubular member extending radially therethrough providing a portion extending from the bottom thereof and a portion extending upwardly within the pocket thereof, and an L-shaped bracket member connected in fixed relation to the portion of the tubular portion which extends within the pocket of the cup to provide a bracket arm which extends laterally over the cup.

6. A device for preventing insects from gaining access to an article comprising a supporting base, members providing sockets at the ends of said base, hollow tubular standards vertically carried in said members, cups of semi-spherical formation, and substantially L-shaped brackets each including a portion connected in fixed relation to a cup providing a socket upwardly therein adapted to receive the upper end of a standard, so that the cup may be detachably positioned upon the standard, each L-shaped bracket providing a portion extending laterally in horizontal manner over the cup.

7. A device of the class described comprising a base, vertical standard supports carried by said base in spaced relation, cups, means for detachably and non-rotatably mounting said cups upon the upper ends of said standards, a receptacle providing open sockets at the ends thereof, and bracket means rigid with said cups extending for detachable insertion at their free ends in the sockets at the ends of said receptacle, whereby to oscillatively support the receptacle in suspended relation over said base intermediate said standards.

8. A device of the class described comprising a supporting base, standards vertically carried at the ends of said base, cups adapted to receive insect repelling liquid, means for detachably and non-rotatably suspending said cups upon said standards, L-shaped bracket arms extending upwardly from within the pockets of said cups and laterally over the same providing at the free ends thereof enlarged bevelled shaped heads, a receptacle, and members at the ends of said receptacle providing pockets therein adapted for slidably receiving the enlarged heads of the bracket arms therein, whereby the receptacle may be detachably and oscillatively supported upon said bracket arms intermediate said standards and above said base.

9. A device of the class described comprising a base, standards carried by said base, pins laterally extending from said standards at the upper ends thereof, cups, means extending from below said cups providing slots for receiving the lateral extensions of said pins upon said standards, whereby to detachably and non-rotatably support said cups at the upper ends of said standards, and bracket arms extending upwardly in rigid relation from within said cups.

10. A device of the class described comprising a sectional base having outwardly extending reduced portions at the ends thereof, vertical standards carried upon the outwardly extending reduced portions of the sections of said base formed of tubular material, cups, tubular means formed rigid with said cups extending below and upwardly within the pockets thereof and providing sockets for detachably receiving the upper ends of the standards, means upon the standards and the tubular portions of said cups to permit detachable and non-rotatable mounting of the cups upon said standards, L-shaped brackets carried in rigid relation within the hollow tubular portions of said cups extending above said cups and providing enlarged heads at the inwardly extending ends of said brackets, a receptacle, means mounted at the ends of said receptacle providing sockets therein adapted to receive the enlarged heads of said brackets whereby the receptacle may be oscillatively supported between said standards and upwardly of said base.

11. A device of the class described comprising a collapsible base formed in sections, standards carried by the collapsible base sections, cups carried at the upper ends of said standards, a receptacle, and means supporting said receptacle, said means extending upwardly from within the pockets of said cups.

CHARLES HENRY GREGORIE.